Sept. 11, 1934. A. POTDEVIN 1,972,903
APPARATUS FOR HANDLING STRIP MATERIAL
Filed Jan. 8, 1932
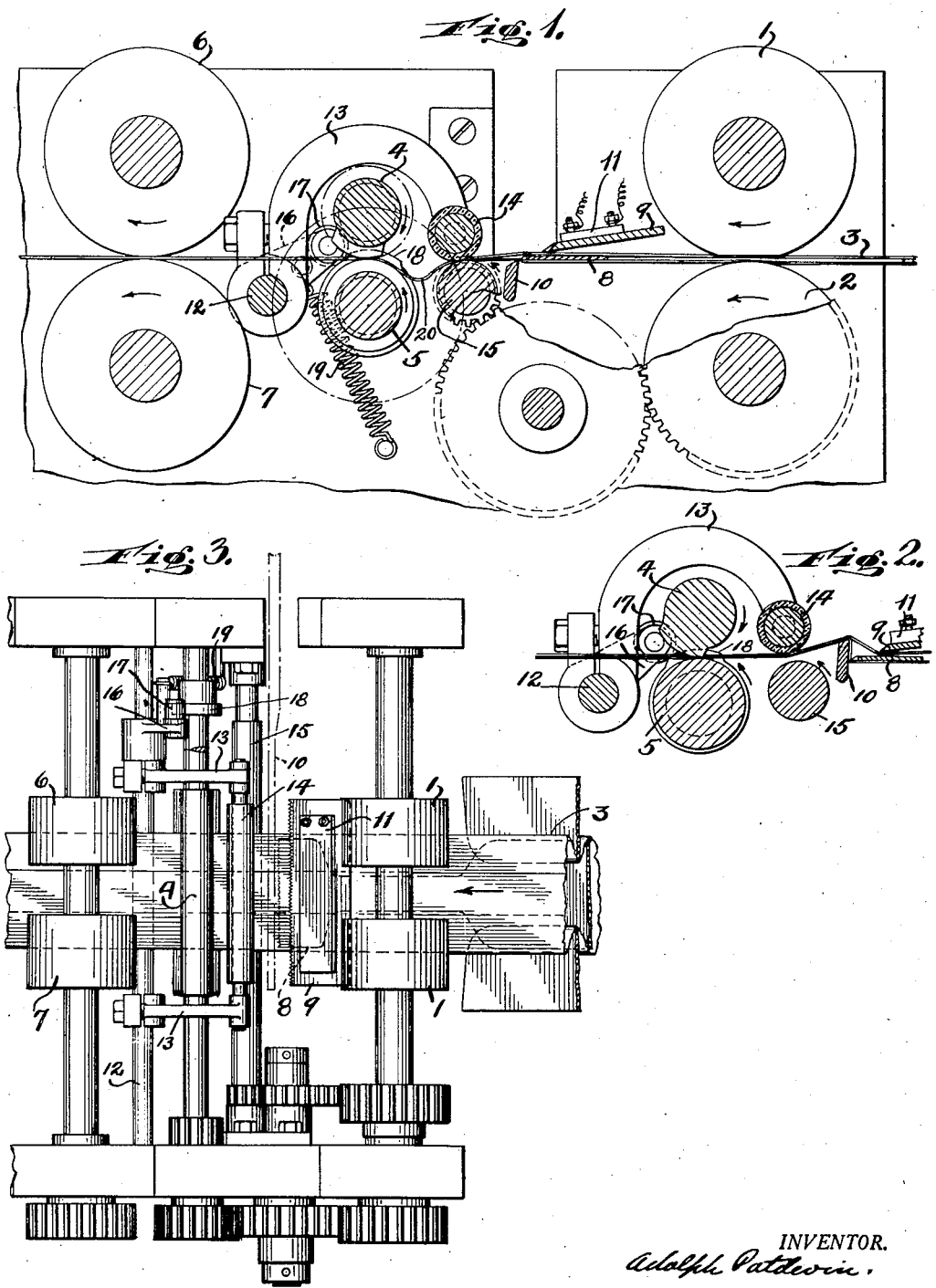
INVENTOR.
Adolph Potdevin.
BY
Kiddle Margeson and Hornidge
ATTORNEYS.

Patented Sept. 11, 1934

1,972,903

UNITED STATES PATENT OFFICE 1,972,903

APPARATUS FOR HANDLING STRIP MATERIAL

Adolph Potdevin, Garden City, N. Y., assignor to Potdevin Machine Company, Brooklyn, N. Y., a corporation of New York Application January 8, 1932, Serial No. 585,520

6 Claims. (Cl. 271—2.1)

This invention relates to machines for handling flexible sheet or web material, and has for one of its objects the provision of a machine which is particularly well adapted for use in connection with the handling of cellophane and similar materials.

The present invention provides a construction wherein a slack is built up in the advancing material by interposing pinchrolls in the path of the material, these rolls traveling at a lower speed than the advancing or feeding means, additional means being provided whereby creasing or wrinkling of the material during the slack-forming period and the cutting-off period is avoided.

This is of material advantage when working on very thin papers or when working with material such as cellophane, wrinkling or creasing of the latter causing the same to shatter and break and unfit it for use.

In the drawing accompanying this application:

Fig. 1 is a sectional elevational view of an embodiment of my invention;

Fig. 2 is a view similar to Fig. 1 showing the position of certain of the parts during the cutting-off operation; and Fig. 3 is a plan view.

Referring to the drawing in detail, 1 and 2 designate, respectively, the upper and lower feed rollers for continuously advancing the web 3. 4 and 5 designate, respectively, the upper and lower pinch rolls, while 6 and 7 are advancing rollers, the pinch rolls lying intermediate the feed rollers and the advancing rollers.

Intermediate the feed rollers and the pinch rolls is cutting-off or severing mechanism which may be conventional in form and comprise stationary plates 8 and 9 and striker bar 10.

When cellophane or similar material is being handled I prefer to heat the plate 9 of the cutting-off mechanism by equipping the same with electric hot plate 11, heating of the cutting-off mechanism facilitating severing of the cellophane.

Extending transversely of the machine frame is a rod 12 carrying a pair of arms 13, the free ends of which mount a roller 14, the arms being shaped so as to bring the roller 14 into contact with the material 3 between the cutting-off mechanism and the pinch rolls.

15 designates a positively driven roller extending transversely of the machine just below the roller 14 and cooperable therewith, the peripheral speed of this driven roller being the same or slightly higher than that of the feed rollers 1 and 2.

The rod or rock shaft 12 carries an arm 16 provided with cam follower roller 17 adapted to cooperate with a cam 18 mounted on the shaft 60 of the lower pinch roll 5. A spring 19 is employed to pull the cam roller 17 in contact with cam 18 and hold it against the cam during cam's rotation.

In operation the material 3 is advanced by the feed rollers 1 and 2 between the roller 14 and positively driven roller 15 to the pinch rolls 4 and 5 and from thence to the forwarding rollers 6 and 7. The roller 15, as above pointed out, is driven at the same or at a slightly higher peripheral speed than the feed rollers 1 and 2 so that the length of material between the rollers 14 and 15 and the feed rollers is kept taut during the inactive period of the cam 18.

As the material 3 advances the pinch rolls 4 and 5 finally come into operation to grip the material and retard its advance, the peripheral speed of the active part or portion of the pinch rolls being lower than that of the feed rollers 1 and 2 and lower than that of positively driven roller 15. This provides a slack designated 20 between the rollers 14 and 15 and the pinch rolls, the cam 18 during this slack-forming period being out of engagement with the cam follower 17, so that the roller 14 is in its lowermost position. Consequently while there is a slack in the material 3 between the rollers 14 and 15 and the pinch rolls, the material on the other side of the rollers 14 and 15 as far back as the feed rollers 1 and 2 is under tension. As the striker bar 10 moves up to sever the material across the edges of the plates 8 and 9 the cam 18 engages the follower 17 to raise the roller 14 slowly as seen in Fig. 2, the action of all the parts being so coordinated and timed that the material between the cutting-off mechanism and the feed rollers will always be under sufficient tension to prevent creasing or wrinkling of this part of the material.

What I claim is:—

1. In a machine of the class described, the combination of feed rollers for advancing a flexible strip or web, pinch rolls in the path of said material, and a pair of rolls intermediate the feed rollers and pinch rolls and lying in the path of the advancing web and traveling at a higher peripheral speed than the feed rollers and pinch rolls, to maintain tension in that portion of the web extending from the feed rolls to said intermediate rolls, said intermediate rolls cooperating with the pinch rolls to produce a slack in that portion of the web extending from the intermediate rolls to the pinch rolls.

2. In a machine of the class described, the combination of a pair of feed rollers for advancing a flexible strip or web, pinch rolls in the path of the advancing material and having a peripheral speed lower than that of the feed rollers for producing slack in the strip or web, and a pair of intermediate rolls in the path of the advancing material having a peripheral speed not less than that of the feed rollers maintaining tension in the material between the intermediate rolls and the feed rollers while permitting of slack in the strip or web between the intermediate rolls and the pinch rolls.

3. In a machine of the class described, the combination of a pair of feed rollers for advancing a flexible strip or web, cooperating pinch rolls for producing slack in the strip or web, and a pair of intermediate rolls for maintaining tension in the web between said intermediate rolls and the feed rollers while permitting of slack in the strip or web between the intermediate rolls and the pinch rolls.

4. In a machine of the class described, the combination of a pair of feed rollers for advancing a flexible strip or web, cooperating pinch rolls for producing slack in the strip or web, and a pair of intermediate rolls one of which is positively driven at a higher peripheral speed than the feed rollers to maintain tension in the web between the intermediate rolls and the feed rollers while permitting of slack in the strip or web between the intermediate rolls and the pinch rolls.

5. In a machine of the class described, the combination of a pair of feed rollers for advancing a flexible strip or web, cooperating pinch rolls for producing slack in the strip or web, and a pair of intermediate rolls one of which is positively driven at a peripheral speed not less than that of the feed rollers to maintain tension in the web between the intermediate rolls and the feed rollers while permitting of slack in the strip or web between the intermediate rolls and the pinch rolls.

6. In a machine of the class described, the combination of feed rollers for advancing a flexible strip, pinch rolls cooperating therewith, and means cooperating with the feed rollers and the pinch rolls for maintaining tension in one portion of the web lying between the feed rollers and the pinch rolls while a slack is being formed in the adjacent portion of the web.

ADOLPH POTDEVIN.